(12) United States Patent
Prasad et al.

(10) Patent No.: US 8,699,779 B1
(45) Date of Patent: Apr. 15, 2014

(54) SYSTEMS AND METHODS FOR ALIGNMENT OF CHECK DURING MOBILE DEPOSIT

(75) Inventors: Bharat Prasad, San Antonio, TX (US); Minya Liang, San Antonio, TX (US); Reynaldo Medina, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 815 days.

(21) Appl. No.: 12/549,443

(22) Filed: Aug. 28, 2009

(51) Int. Cl.
*G06K 9/00* (2006.01)

(52) U.S. Cl.
USPC .......................................................... 382/137

(58) Field of Classification Search
USPC .......................................................... 382/137
See application file for complete search history.

(56) References Cited

U.S. PATENT DOCUMENTS

| | | |
|---|---|---|
| 3,005,282 A | 10/1961 | Christiansen |
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |

(Continued)

FOREIGN PATENT DOCUMENTS

EP    0 984 410 A1    3/2000

OTHER PUBLICATIONS

Mitek Systems, "ImageNet Mobile Deposit", San Diego, California, 2 pages.

(Continued)

*Primary Examiner* — Tom Y Lu

(74) *Attorney, Agent, or Firm* — Brinks Gilson & Lione

(57) ABSTRACT

An alignment guide may be provided in the field of view of a camera associated with a mobile device used to capture an image of a check. When the image of the check is within the alignment guide in the field of view, an image may be taken by the camera and provided from the mobile device to a financial institution. The alignment guide may be adjustable at the mobile device. The image capture may be performed automatically by the camera or the mobile device as soon as the image of the check is determined to be within the alignment guide. The check may be deposited in a user's bank account based on the image. Any technique for sending the image to the financial institution may be used.

23 Claims, 9 Drawing Sheets

(56) References Cited

U.S. PATENT DOCUMENTS

| | | |
|---|---|---|
| 4,644,144 A | 2/1987 | Chandek |
| 4,722,444 A | 2/1988 | Murphy |
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,444,794 A | 8/1995 | Uhland, Sr. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-Wahr |
| 6,085,168 A | 7/2000 | Mori |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. |
| 6,463,220 B1 | 10/2002 | Dance et al. |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 * | 8/2003 | Windle ........................ 348/239 |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |

(56) References Cited

U.S. PATENT DOCUMENTS

| | | |
|---|---|---|
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,792,752 B1 | 9/2010 | Kay |

(56) References Cited

U.S. PATENT DOCUMENTS

| | | |
|---|---|---|
| 7,792,753 B1 | 9/2010 | Slater et al. |
| 7,810,714 B2 | 10/2010 | Murata |
| 7,812,986 B2 | 10/2010 | Graham et al. |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,949,587 B1 | 5/2011 | Morris et al. |
| 7,950,698 B2 | 5/2011 | Popadic et al. |
| 7,953,441 B2 | 5/2011 | Lors |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 * | 7/2011 | Nepomniachtchi et al. .. 382/137 |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,204,293 B2 | 6/2012 | Csulits et al. |
| 8,235,284 B1 | 8/2012 | Prasad et al. |
| 8,320,657 B1 | 11/2012 | Burks et al. |
| 8,358,826 B1 | 1/2013 | Medina, III et al. |
| 8,422,758 B1 | 4/2013 | Bueche, Jr. |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0159648 A1 | 10/2002 | Alderson et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0132384 A1 | 7/2003 | Sugiyama et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |

(56) References Cited

U.S. PATENT DOCUMENTS

| | | |
|---|---|---|
| 2005/0049950 A1 | 3/2005 | Johnson |
| 2005/0071283 A1 | 3/2005 | Randle et al. |
| 2005/0075969 A1 | 4/2005 | Nielson |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada et al. |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu et al. |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li |
| 2006/0039629 A1 | 2/2006 | Li et al. |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1 | 5/2006 | Maloney |
| 2006/0115110 A1 | 6/2006 | Rodriguez et al. |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0217669 A1 | 9/2007 | Swift et al. |
| 2007/0233585 A1 | 10/2007 | Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |

(56) References Cited

U.S. PATENT DOCUMENTS

| | | |
|---|---|---|
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0040280 A1 | 2/2008 | Davis et al. |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLauqhlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0167870 A1 | 7/2009 | Caleca et al. |
| 2009/0171819 A1 | 7/2009 | Emde et al. |
| 2009/0171825 A1 | 7/2009 | Roman |
| 2009/0173781 A1 | 7/2009 | Ramachandran |
| 2009/0185738 A1 | 7/2009 | Nepomniachtchi |
| 2009/0190823 A1 | 7/2009 | Walters |
| 2009/0192938 A1 | 7/2009 | Amos |
| 2009/0236413 A1 | 9/2009 | Mueller et al. |
| 2009/0252437 A1 | 10/2009 | Li |
| 2009/0254447 A1 | 10/2009 | Blades |
| 2009/0281904 A1 | 11/2009 | Pharris |
| 2009/0313167 A1 | 12/2009 | Dujari |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1* | 4/2010 | Walach et al. .................. 705/35 |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0016084 A1 | 1/2011 | Mundy et al. |
| 2011/0112967 A1 | 5/2011 | Anderson et al. |
| 2011/0310442 A1 | 12/2011 | Popadic et al. |
| 2013/0021651 A9 | 1/2013 | Popadic et al. |

OTHER PUBLICATIONS

DeBello, James et al., "RDM and Mitek Systems to Provide Mobile Check Deposit", *Mitek Systems, Inc.*, San Diego, California and Waterloo, Ontario (Feb. 24, 2009),2 pages.

Nixon, Julie et al., "Fisery Research Finds Banks are Interested in Offering Mobile Deposit Capture as an", *Fiserv, Inc*, Brookfield, Wis., (*Business Wire*), (Feb. 20, 2009),2 pages.

"Accept "Customer Not Present" Checks," Accept Check Online, http://checksoftware.com, Cited in patent No. 7,900,822, as dated 2007 (1 pg).

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check21/solutions.htm, Cited in patent No. 7,900,822, as dated 2007 (8 pgs).

"Check Fraud: A Guide to Avoiding Losses", All Net, http://all.net/books/audit/checkfraud/security.htm, Cited in patent No. 7,900,822, as dated 2007 (1 pg).

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm, Cited in patent No. 7,900,822, as dated 2007 (6 pgs).

"Direct Deposit Application for Payroll", Purdue University, Business Office Form 0003, http://purdue.edu/payroll/pdf/directdepositapplication.pdf, Jul. 2007 (2 pgs).

"Direct Deposit Authorization Form", www.umass.edu/humres/library/DDForm.pdf, May 2003 (3 pgs).

"Direct Deposit," University of Washington, http://www.washington.edu/admin/payroll/directdeposit.html, Cited in patent No. 7,900,822, as dated 2007 (3 pgs).

"Electronic Billing Problem: The E-check is in the mail" American Banker-vol. 168, No. 95, May 19, 2003 (4 pgs).

"Frequently Asked Questions" Bank of America, http://www/bankofamerica.com/deposits/checksave/index.cfm?template-lc_faq_bymail, Cited in patent No. 7,900,822, as dated 2007 (2 pgs).

"Full Service Direct Deposit", www.nonprofitstaffing.com/images/upload/dirdepform.pdf. Cited in patent No. 7,900,822, as dated 2001, (2 pgs).

"How to Digitally Deposit a Check Image", Smart Money Daily, Copyright 2008 (5 pgs).

"ImageNet Mobile Deposit Provides Convenient Check Deposit and Bill Pay to Mobile Consumers," Miteksystems, 2008 (2 pgs).

"It's the easiest way to Switch banks", LNB, http://www.inbky.com/pdf/LNBswitch-kit10-07.pdf Cited in patent No. 7,996,316, as dated 2007 (7 pgs).

"Lesson 38—More Bank Transactions", Turtle Soft, http://www.turtlesoft.com/goldenseal-software-manual.lesson38.htm, Cited in patent No. 7,900,822, as dated 2007 (8 pgs).

"Middleware", David E. Bakken, Encyclopedia of Distributed Computing, Kluwer Academic Press, 2001 (6 pgs).

"Mitek Systems Announces Mobile Deposit Application for Apple iPhone," http://prnewswire.com/cgi-bin/stories/pl?ACCT=104&STORY=/www/story/10-01-..., Nov. 25, 2008 (2 pgs).

"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).

"Refractive index" Wikipedia, the free encyclopedia; http://en.wikipedia.org/wiki/refractiveindex.com Oct. 16, 2007 (4 pgs).

(56) References Cited

OTHER PUBLICATIONS

"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).
"Remote Deposit" National City, http://www.nationalcity.com/smallbusiness/cashmanagement/remotedeposit/default.asp; Cited in patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_your_business/businessbits/d908484987.brc, Cited in patent No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in patent No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in patent No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_cconversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in patent No. 7,970,677, as dated 2006, (4 pgs).
BankServ, Product Overview, http://www.bankserv.com/products/remotedeposit.htm, Cited in patent No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in patent No. 7,900,822, as dated Apr. 26, 2006 (3 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Bruene, Jim; "Check Free to Enable In-Home Remote Check Deposit for Consumers and Small Business", NetBanker. Com, Financial Insite, Inc., http://www.netbanker.com/2008/02/checkfree_to_enableinhome_rem.html, Feb. 5, 2008 (3pgs.).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.d11/article?AID=/20060201/BIZ0102/602010327&templ..., May 23, 2008 (2 pgs).
CNN.conn/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures A New Checking Twist", Bank Technology News Article—May 2005, www.americanbanker.com/btn_article.html?id=20050502YQ5OFSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
DCU Member's Monthly—Jan. 2008, "PC Deposit—Deposit Checks from Home!", http://www.mycreditunionnewsletter.com/dcu/01 08/page1. html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in patent No. 7,873,200, as dated Dec. 2005 (20 pgs).

(56) References Cited

OTHER PUBLICATIONS

Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the Internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Image Master, "Photo Restoration: We specialize in digital photo restoration and photograph repair of family pictures", http://www.imphotorepair.com, Cited in patent No. 7,900,822, as downloaded Apr. 2007 (1 pg).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; Docket No. R 1176"Availability of Funds and Collection of Checks". Cited in patent No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).
Levitin, Adam J., Remote Deposit Capture: A Legal and Transactional Overview, Banking Law Journal, p. 115, 2009 (RDC).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is 200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in patent No. 7,900,822, as dated 2006 (3 pgs).
Oxley, Michael G. from committee on Financial Services; "Check Clearing for the 21$^{st}$ Century Act", 108$^{th}$ Congress, 1$^{st}$ Session House of Representatives report 108-132, Jun. 2003 (20 pgs).
Oxley, Michael G., from the committee of conference; "Check Clearing for the 21$^{st}$ Century Act" 108$^{th}$ Congress, 1$^{st}$ Session Senate report 108-291, Oct. 1, 2003 (27 pgs).
Palacios, Rafael et al., "Automatic Processing of Brazilian Bank Checks". Cited in patent No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21$^{st}$ Century Act", Oct. 28, 2003, 117 STAT. 1177 (18 pgs).
Rao, Bharat; "The Internet and The Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in patent No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).

(56) References Cited

OTHER PUBLICATIONS

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).

Rose, Sarah et al., "Best of the We: The Top 50 Financial Websites", Money, New York, Dec. 1999, vol. 28, Iss. 12 (8 pgs).

Shelby, Hon. Richard C. (Committee on Banking, Housing and Urban Affairs); "Check Truncation Act of 2003", calendar No. 168, 108th Congress, 1st Session Senate report 108-79, Jun. 2003 (27 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html (2 pgs).

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in patent No. 7,900,822, as dated Dec. 2005 (3 pgs).

The Green Sheet 2.0: Newswire, "Co-Op adds home deposit capabilities to suite of check imaging products", www.greensheet.com/newswire.php?newswire_id=8799, Mar. 5, 2008 (2 pgs).

Tygar, J.D., Atomicity in Electronic Commerce, In ACM Networker, 2:2, Apr./May 1998 (12 pgs).

Valentine, Lisa, "Remote Deposit Capture Hot Just Got Hotter," ABA Banking Journal, Mar. 2006, p. 1-9.

Wade, Will, "Early Notes: Updating Consumers on Check 21" American Banker Aug. 10, 2004 (3 pgs).

Wallison, Peter J., "Wal-Mart Case Exposes Flaws in Banking-Commerce Split", American Banker, vol. 167. No. 8, Jan. 11, 2002 (3 pgs).

Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005 check21Year=2005 (1 pg).

Wells Fargo Commercial, "Remote Deposit".www.wellsfargo.com/com/treasury mgmtlreceivables/electronic/remote deposit, Copyright 2008 (1 pg).

White, J.M. et al., "Image Thresholding for Optical Character Recognition and Other Applications Requiring Character Image Extraction", IBM J. Res. Development, Jul. 1983, vol. 27, No. 4 (12 pgs).

Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).

Wikipedia®, "Remote Deposit," http://en.wikipedia.org/wiki/Remote_deposit, 2007 (3 pgs).

Windowsfordevices.com, "Software lets camera phone users deposit checks, pay bills", www.windowsfordevices.com/news/NS3934956670.html, Jan. 29, 2008 (3 pgs).

Wolfe, Daniel, "Check Image Group Outlines Agenda," American Banker, New York, N.Y.: Feb. 13, 2009, vol. 174, Iss. 30, p. 12. (2 pgs).

Woody Baird Associated Press, "Pastor's Wife got Scammed—She Apparently Fell for Overseas Money Scheme," The Commercial Appeal, Jul. 1, 2006, p. A. 1.

Zhang, C.Y., "Robust Estimation and Image Combining" Astronomical Data Analysis Software and Systems IV, ASP Conference Series, 1995 (5 pgs).

Zions Bancorporation, "Moneytech, the technology of money in our world: Remote Deposit," http://www.bankjunior.com/pground/moneytech/remote_deposit.jsp, 2007 (2 pgs).

Application filed Apr. 3, 2008 for U.S. Appl. No. 12/062,143 (27 pgs).

Application filed Aug. 19, 2010 for U.S. Appl. No. 12/859,741 (235 pgs).

Application filed Aug. 21, 2008 for U.S. Appl. No. 12/195,723 (38 pgs).

Application filed Aug. 21, 2009 for U.S. Appl. No. 12/545,127 (45 pgs).

Application filed Aug. 28, 2009 for U.S. Appl. No. 12/549,443 (41 pgs).

Application filed Dec. 20, 2006 for U.S. Appl. No. 11/613,656 (21 pgs).

Application filed Dec. 30, 2010 for U.S. Appl. No. 12/982,494 (280 pgs).

Application filed Dec. 30, 2010 for U.S. Appl. No. 12/982,561 (275 pgs).

Application filed Dec. 30, 2010 for U.S. Appl. No. 12/982,578 (274 pgs).

Application filed Dec. 30, 2010 for U.S. Appl. No. 12/982,594 (275 pgs).

Application filed Feb. 15, 2012 for U.S. Appl. No. 13/397,405 (19 pgs).

Application filed Feb. 18, 2009 for U.S. Appl. No. 12/388,005 (37 pgs).

Application filed Jul. 13, 2006 for U.S. Appl. No. 11/487,537 (23 pgs).

Application filed Jul. 27, 2009 for U.S. Appl. No. 12/509,613 (48 pgs).

Application filed Jul. 27, 2009 for U.S. Appl. No. 12/509,680 (41 pgs).

Application filed Jun. 11, 2008 for U.S. Appl. No. 12/137,051 (29 pgs).

Application filed Jun. 8, 2011 for U.S. Appl. No. 13/155,976 (352 pgs).

Application filed Jun. 8, 2011 for U.S. Appl. No. 13/156,007 (356 pgs).

Application filed Jun. 8, 2011 for U.S. Appl. No. 13/156,018 (353 pgs).

Application filed Mar. 15, 2007 for U.S. Appl. No. 11/686,924 (34 pgs).

Application filed Mar. 15, 2007 for U.S. Appl. No. 11/686,928 (36 pgs).

Application filed Mar. 4, 2009 for U.S. Appl. No. 12/397,671 (40 pgs).

Application filed Mar. 4, 2009 for U.S. Appl. No. 12/397,930 (37 pgs).

Application filed May 10, 2007 for U.S. Appl. No. 11/747,222 (35 pgs).

Application filed Oct. 17, 2008 for U.S. Appl. No. 12/253,278 (42 pgs).

Application filed Oct. 23, 2007 for U.S. Appl. No. 11/876,925 (36 pgs).

Application filed Oct. 23, 2007 for U.S. Appl. No. 11/877,335 (29 pgs).

Application filed Oct. 25, 2007 for U.S. Appl. No. 11/923,839 (22 pgs).

Application filed Oct. 29, 2007 for U.S. Appl. No. 11/926,388 (23 pgs).

Application filed Oct. 30, 2007 for U.S. Appl. No. 11/928,297 (26 pgs).

Application filed Oct. 31, 2006 for U.S. Appl. No. 11/590,974 (31 pgs).

Application filed Oct. 31, 2006 for U.S. Appl. No. 11/591,008 (27 pgs).

Application filed Oct. 31, 2006 for U.S. Appl. No. 11/591,227 (58 pgs).

Application filed Oct. 31, 2006 for U.S. Appl. No. 11/591,273 (56 pgs).

Application filed Oct. 31, 2007 for U.S. Appl. No. 11/930,537 (27 pgs).

Application filed Oct. 31, 2007 for U.S. Appl. No. 11/931,670 (47 pgs).

Application filed Oct. 8, 2007 for U.S. Appl. No. 11/868,884 (30 pgs).

Application filed Sep. 28, 2007 for U.S. Appl. No. 11/864,569 (35 pgs).

Application filed Sep. 8, 2008 for U.S. Appl. No. 12/205,996 (30 pgs).

Claims as filed on Apr. 3, 2008 for U.S. Appl. No. 12/062,163 (3 pgs).

(56) References Cited

OTHER PUBLICATIONS

Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Dec. 8, 2010 for U.S. Appl. No. 12/963,513 (7 pgs).
Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Application as filed on Dec. 20, 2012 for U.S. Appl. No. 13/721,945 (55 pgs).
Application as filed on Dec. 20, 2012 for U.S. Appl. No. 13/722,303 (32 pgs).
Application as filed on Feb. 28, 2013 for U.S. Appl. No. 13/780,946 (55 pgs).
Application as filed on Jan. 16, 2013 for U.S. Appl. No. 13/742,909 (31 pgs).
Application as filed on Jan. 7, 2013 for U.S. Appl. 13/735,678 (30 pgs).
Application as filed on Mar. 15, 2013 for U.S. Appl. No. 13/833,182 (74 pgs).
Application as filed on Mar. 15, 2013 for U.S. Appl. No. 13/834,353 (37 pgs).
Application as filed on Mar. 15, 2013 for U.S. Appl. No. 13/837,883 (28 pgs).
Application as filed on Mar. 15, 2013 for U.S. Appl. No. 13/840,761 (56 pgs).
Application as filed on Mar. 15, 2013 for U.S. Appl. No. 13/842,112 (62 pgs).
Application as filed on Oct. 19, 2012 for U.S. Appl. No. 13/656,164 (32 pgs).
Application as filed Sep. 14, 2012 for U.S. Appl. No. 13/619,405 (30 pgs).
Claims as filed on Dec. 20, 2012 for U.S. Appl. No. 13/722,576 (4 pgs).
Claims as filed on Dec. 20, 2012 for U.S. Appl. No. 13/722,602 (4 pgs).
Claims as filed on Feb. 12, 2013 for U.S. Appl. No. 13/765,412 (1 pg).
Claims as filed on Feb. 19, 2013 for U.S. Appl. No. 13/770,048 (4 pgs).
Claims as filed on Nov. 20, 2012 for U.S. Appl. No. 13/682,268 (4 pgs).
Claims as filed on Sep. 14, 2012 for U.S. Appl. No. 13/619,026 (3 pgs).
Doermann, David et al., "*Progress in Camera-Based Document Image Analysis*", Proceedings of the Seventh International Conference on Document Analysis and Recognition (ICDAR 2003) 2003 IEEE (11 pages).
Claims as filed on Jun. 20, 2013 for U.S. Appl.No. 13/922,686 (7 pgs).
Office Action from corresponding U.S. Appl. No. 13/922,686 dated Oct. 16, 2013 (31 pgs).
Response and Amended Claims as filed on Jan. 16, 2014 for U.S. Appl. No. 13/922,686 (19 pgs.).
Claims as filed on Aug. 21, 2009 for U.S. Appl. No. 12/545,127 (5 pgs.).
Office Action from corresponding U.S. Appl. No. 12/545,127 dated Nov. 8, 2011 (6 pgs.).
Final Office Action from corresponding U.S. Appl. No. 12/545,127 dated Apr. 4, 2012 (6 pgs.)
Office Action from corresponding U.S. Appl. No. 12/545,127 dated Oct. 9, 2013 (7 pgs.)
Appeal Brief from corresponding U.S. Appl. No. 12/454,127 dated Nov. 6, 2012 (21 pgs.)

\* cited by examiner

SYSTEMS AND METHODS FOR ALIGNMENT OF CHECK DURING MOBILE DEPOSIT

BACKGROUND

Checks typically provide a safe and convenient method for an individual such as a payor to transfer funds to a payee. To use a check, the individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. To reduce such burdens for the payee, systems and methods have been developed to enable the remote deposit of checks.

For example, the payee may capture a digital image of a check using a mobile device. The financial institution may then receive from the payee the digital image of the check. The financial institution may then use the digital image to credit funds to the payee. However, such a technique requires the efficient and accurate detection and extraction of the information pertaining to a check in the digital image. Capturing a digital image at a mobile device that allows for detection and extraction of the information from the digital image is difficult.

SUMMARY

An alignment guide may be provided in the field of view of a camera associated with a mobile device used to capture an image of a check. When the image of the check is within the alignment guide in the field of view, an image may be taken by the camera and provided from the mobile device to a financial institution. The check may be deposited in a user's bank account based on the image. Any technique for sending the image to the financial institution may be used.

In an implementation, the alignment guide may be adjustable at the mobile device. The adjustment may be made by the user, the financial institution, the camera, and/or the mobile device. In an implementation, an image may be captured when the image of the check is detected to be within the alignment guide. The image capture may be performed automatically by the camera or the mobile device as soon as the image of the check is determined to be within the alignment guide.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In the following detailed description of example embodiments, reference is made to the accompanying drawings, which form a part hereof and in which is shown, by way of illustration, specific embodiments in which the example methods, apparatuses, and systems may be practiced. It is to be understood that other embodiments may be used and structural changes may be made without departing from the scope of this description.

Figure 1:
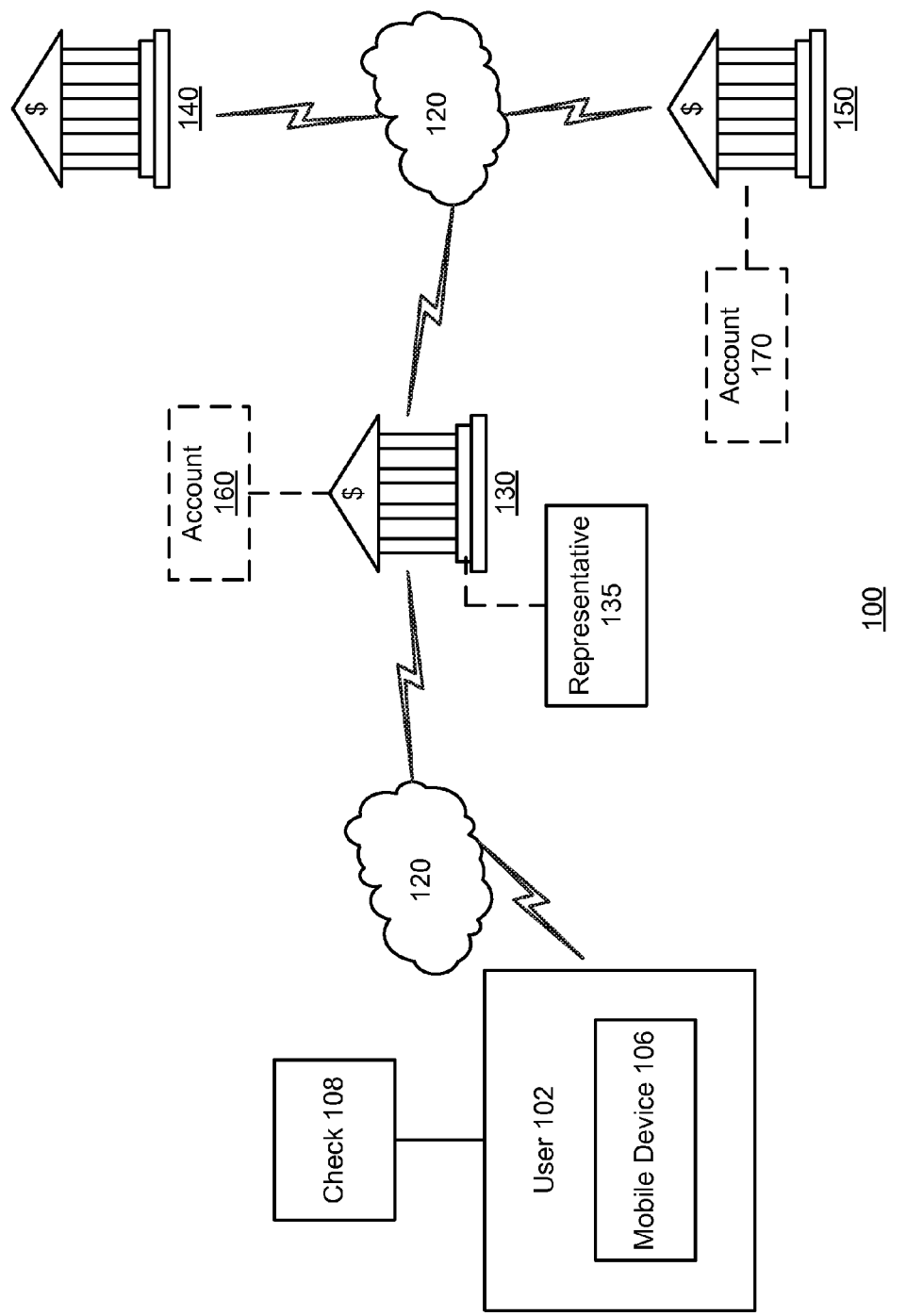
FIG. 1 is a block diagram of an implementation of a system in which example embodiments and aspects may be implemented.

FIG. 1 is a block diagram of an implementation of a system 100 in which example embodiments and aspects may be implemented. System 100 may include an account owner, referred to herein as a user 102, and financial institutions 130, 140, and 150, which may be any type of entity capable of processing a transaction involving a negotiable instrument. For example, financial institutions 130, 140, and 150 may be a retail bank, an investment bank, an investment company, a regional branch of the Federal Reserve, a clearinghouse bank and/or a correspondent bank.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check. The check may be taken by the receiving party and deposited into an account at a financial institution of the receiving party. The receiving party may endorse the check and then present it for deposit at a bank branch, via an automated teller machine (ATM), or by using remote deposit. Other examples of negotiable instruments include money orders, cashier's checks, drafts, bills of exchange, promissory notes, and the like. A money order is a trusted financial instrument that is a payment order for a pre-specified amount of money. A cashier's check (also known as a bank check, official check, teller's check, bank draft or treasurer's check) is a check guaranteed by a bank and may be purchased from a bank.

The user 102 may be an individual or entity who owns account 160 that may be held at financial institution 130. Account 160 may be any type of deposit account for depositing funds, such as a savings account, a checking account, a brokerage account, and the like. The user 102 may deposit a check 108 or other negotiable instrument in the account 160 either electronically or physically. The financial institution 130 may process and/or clear the check 108 or other negotiable instrument. The user 102 may communicate with financial institution 130 by way of communications network 120 such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 102 may communicate with financial institution 130 by phone, email, instant messaging, text messaging, web chat, facsimile, mail, and the like. Financial institutions 130, 140, and 150 also may communicate with each other by way of communications network 120.

In an implementation, the user 102 may receive payment from another individual such as a payor in the form of a check 108 or other negotiable instrument that is drawn from account 170 at financial institution 150. The user 102 may endorse the check 108 (e.g., sign the back of the check 108) and indicate an account number on the check 108 for depositing the funds. It is noted that although examples described herein may refer to a check, the techniques and systems described herein are contemplated for, and may be used for, deposit of any negotiable instrument. Similarly, the techniques and systems described herein are contemplated for and may be used with any form or document whose image may be captured with a camera or other imaging device of a mobile device for subsequent storage and/or processing.

As described further herein, a digital image of a check or other negotiable instrument may be provided from a user to a financial institution, and the digital image may be processed and funds associated with the check or negotiable instrument in the digital image may be deposited in a user's bank account. The user 102 may deposit the check 108 into account 160 by making a digital image of the check 108 and sending the image file containing the digital image to financial institution 130. For example, after endorsing the check 108, the user 102 may use a mobile device 106 that comprises a camera to convert the check 108 into a digital image by taking a picture of the front and/or back of the check 108. The mobile device 106 may be a mobile phone (also known as a wireless phone or a cellular phone), a personal digital assistant (PDA), or any handheld computing device, for example. Aspects of an example mobile device are described with respect to FIG. 10.

To increase the likelihood of capturing a digital image of the check 108 that may be readable and processed such that the check 108 can be cleared, an alignment guide may be provided in the field of view of the camera of the mobile device 106. The field of view is that part of the world that is visible through the camera at a particular position and orientation in space; objects outside the field of view when the image is captured are not recorded in the image. The user may move the camera or the check 108 until the check 108 is viewed within the alignment guide in the field of view of the camera. The digital image of the check 108 may then be captured. The alignment guide may provide a pre-image capture quality check that helps reduce the number of non-conforming images of checks during presentment of the images to a financial institution for processing and clearing.

In an implementation, the image capture may be performed automatically by the camera or the mobile device 106 as soon as the image of the check is determined to be within the alignment guide. Alternatively, the user 102 may manually instruct the camera to perform the image capture (e.g., by pressing a button the camera or the mobile device 106). Examples of alignment guides are described further with respect to FIGS. 3 and 4, for example.

In an implementation, the user 102 may send the digital image(s) to financial institution 130 using the mobile device 106. Any technique for sending a digital image to financial institution 130 may be used, such as providing a digital image to a website associated with financial institution 130 from storage, emailing a digital image to financial institution 130, or sending a digital image in a text message or instant message, for example.

Financial institution 130 may receive a digital image representing the check 108 and may use any known image processing software or other application(s) to obtain the relevant data of the check 108 from the digital image. Financial institution 130 may determine whether the financial information associated therewith may be valid. For example, financial institution 130 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image from the user 102.

The electronic devices may receive the digital image and may perform an initial analysis on the quality of the digital image, the readability of the data contained therein, or the like. For example, the electronic devices may determine whether the account number, amount payable, and the like may be readable such that it may be parsed or otherwise obtained and processed by the financial institution to credit an account 160 associated with the user 102 and debit an account associated with the payor. In an implementation, a representative 135 of financial institution 130 may provide assistance to the user 102 and may provide assistance in determining whether the financial information may be readable and/or of a good enough quality to be processed, as described further herein.

Upon receipt and approval of the digital image, financial institution 130 may credit the funds to account 160. Financial institution 130 may clear the check 108 by presenting a digital image of the check 108 captured from the digital image to an intermediary bank, such as a regional branch of the Federal Reserve, a correspondent bank, and/or a clearinghouse bank. For example, the check 108 may be cleared by presenting the digital image to financial institution 140, which may be a regional branch of the Federal Reserve, along with a request for payment. Financial institutions 130 and 150 may have accounts at the regional branch of the Federal Reserve. Financial institution 130 may create a substitute check using the image provided by the user 102 and present the substitute check to financial institution 140 for further processing. Upon receiving the substitute check, financial institution 140 may identify financial institution 150 as the paying bank (e.g., the bank from which the check 108 is drawn). This may be accomplished using a nine digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check 108 may be cleared internally.

Figure 2:
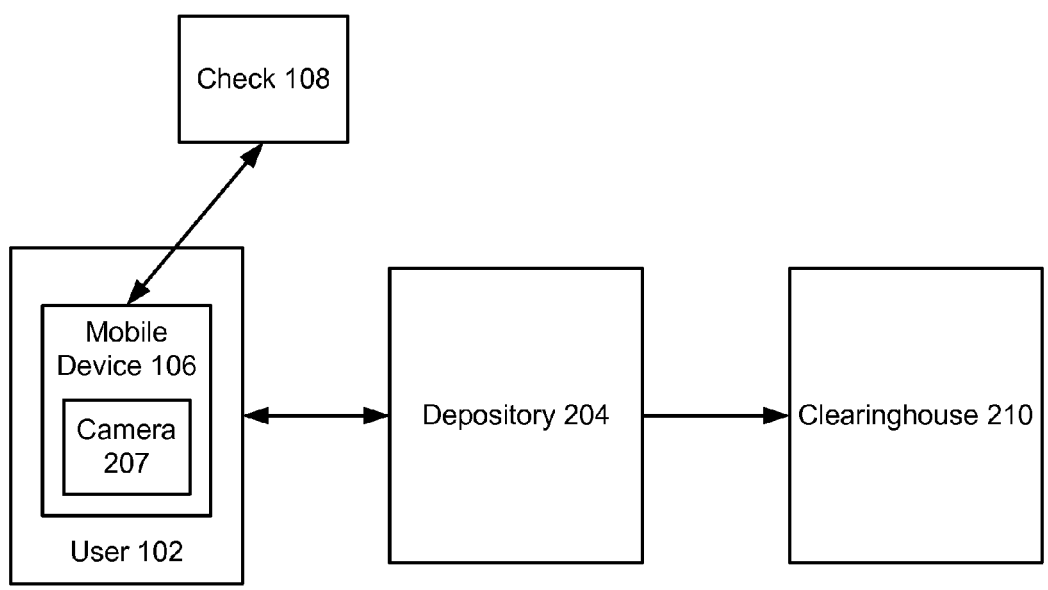
FIG. 2 shows a high-level block diagram of an implementation of a system that may be used for the deposit of a check.

FIG. 2 shows a high-level block diagram of an implementation of a system 200 that may be used for the deposit of a check, such as the check 108. As described further herein, the user 102 may deposit the funds of the check 108 using the camera functionality in the mobile device 106. In the example of one person giving a check to another person, this would enable the receiving party to deposit the funds at that time, without physically visiting an ATM or a bank branch.

In an implementation, the mobile device 106 may comprise a camera 207, such as a digital camera. Such a mobile device may be called a camera phone. The mobile device 106, through the camera 207, has the ability to take or capture a picture or digital image of the check 108 or other negotiable instrument. The camera 207 may take an image of the front of the check 108. Alternatively, the camera 207 may take an image of both the front and the back of the check 108. The back of the check may provide endorsement verification, such as the signature of the person or party the check is made out to. In an implementation, an alignment guide may be provided within the field of view of the camera 207, e.g., using a software application running on the mobile device 106. The alignment guide may be provided during image capture to assist the user 102 in positioning the check 108 so that the image of the check 108 may be captured in such a manner that it may be more easily processed and cleared during subsequent operations, such as those involving one or more financial institutions.

A depository 204 may include a bank in which the user 102 has a deposit account; however, the present disclosure is not limited to just banks. Alternatively, a third party may act as the depository 204 providing functionality to a plurality of users without regard to the bank at which they have deposit accounts, or whether their individual bank allows for the methods and systems described herein. The depository 204, in an implementation, after receiving the image(s) of the check 108 from the user 102, may use a clearinghouse 210 to perform the check clearing operations. As described with respect to the system 100 of FIG. 1, check clearing operations are used by banks to do the final settlement of the check 108, such as removing funds from the account of the payor and transferring those funds to the user's bank. The user's bank may choose to make the funds available to the user 102 immediately and take on the risk that the check 108 does not clear. However, for various reasons, the bank may only make those funds available to the user 102 after the check 108 finally clears.

Figure 3:
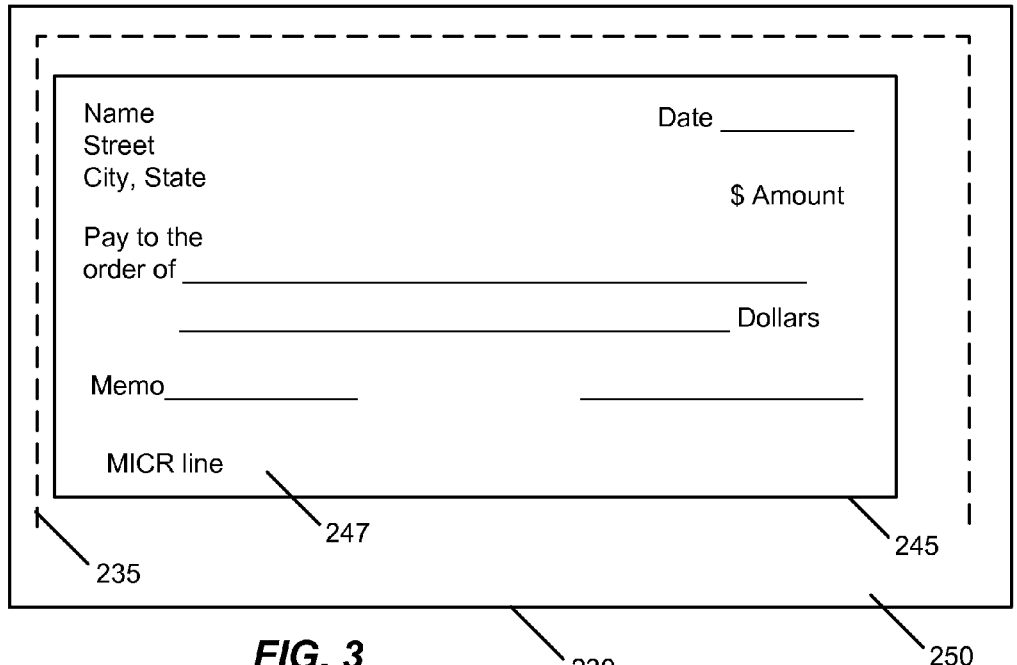
FIG. 3 is a diagram of an example image comprising a check image, a background image, and an alignment guide.

FIG. 3 is a diagram of an example image 230 comprising a check image 247, a background image 250, and an alignment guide 235. The alignment guide 235 may be overlaid on the camera feed of the mobile device 106, in an implementation. The alignment guide 235 is provided in FIG. 3 as a three sided bounding box (e.g., a rectangle in which one of the line segments or sides is removed), but any shape(s) or indicator(s) may be used, such as vertical bars, parallel lines, a circle, a square, a bounding rectangle, or a self-crop tool, for example. Any aspect ratio may be used for the alignment guide, and in an implementation, the aspect ratio may correspond to that of a personal check or a business check.

The image 230 may be provided in the field of view of the camera 207 during image capture of the check 108. The user 102 may move the camera 207 or the check 108 so that the check image 247 appears within or lines up with the alignment guide 235. Some of the background image 250 (e.g., the background on which the check 108 is placed during capture of the image of the check 108) may also be within the alignment guide 235.

When the check image 247 is within the alignment guide 235 (e.g., the edges 245 of the check image 247 are aligned with respect to the alignment guide 235, such as parallel to the associated portion of the alignment guide 235), the check image 247 and the background image 250 (if any) that are within the alignment guide may be captured either automatically (e.g., by the camera or the mobile device under direction of an application running on the camera 207 or the mobile device 106 or the financial institution) or manually (e.g., by the user 102 pressing a button or making a selection on the camera 207 or the mobile device 106).

The digital image thus captured may be provided from the mobile device 106 to a financial institution. The check 108 may be deposited in a user's bank account based on the digital image. Any technique for sending the digital image to the financial institution may be used.

Figure 4:
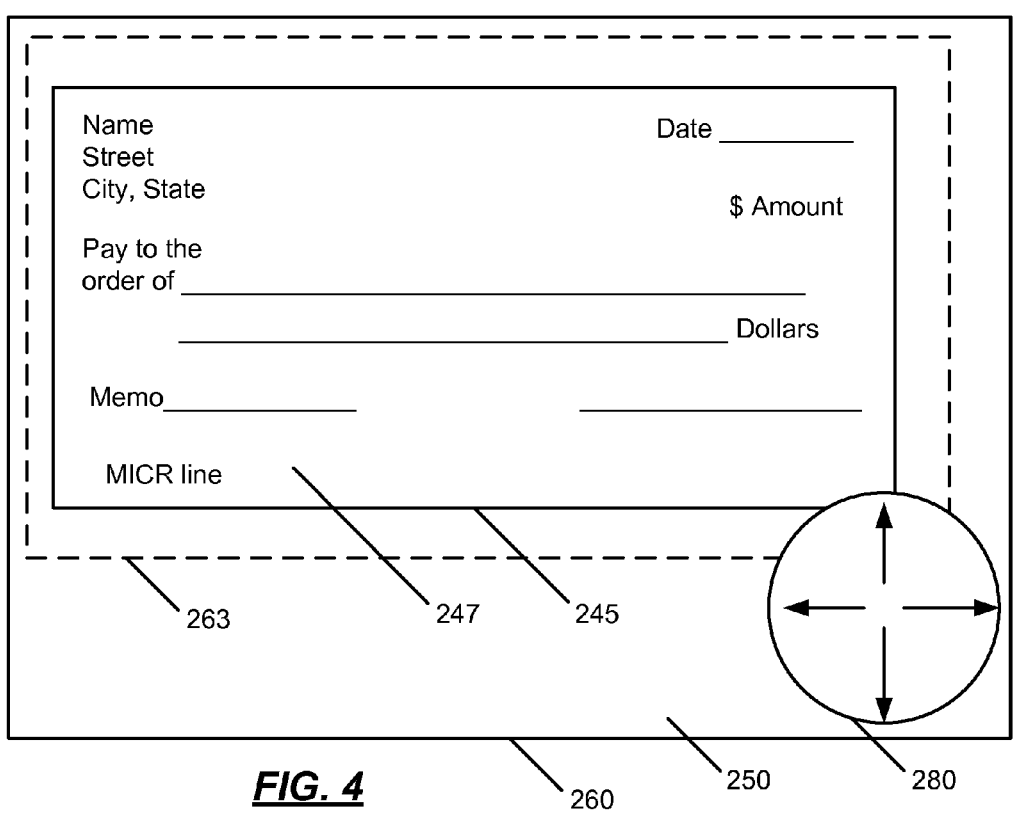
FIG. 4 is a diagram of another example image comprising a check image, a background image, and an alignment guide.

In an implementation, an alignment guide may be provided that is adjustable at the mobile device 106. The adjustment may be made by the user 102, the mobile device 106 and/or the camera 207 (e.g., an application running on the mobile device 106 and/or the camera 207), and/or the financial institution 130. FIG. 4 is a diagram of an example image 260 comprising a check image 247, a background image 250, and an alignment guide 263. The alignment guide 263 is shown as a bounding rectangle, though any shape(s) or indicator(s) may be used. With a bounding rectangle, for example, used as the alignment guide 263, aligning the check means enclosing the check within the alignment guide.

The alignment guide 263 may be adjustable by the user 102 via one or more adjustment buttons, selectors, arrows, or other indicators (shown in FIG. 4 as an adjustment button 280 of the camera 207). For example the user 102 may use the adjustment button 280 to change the shape, aspect ratio, and/or the location of the alignment guide 263 in the field of view of the camera 207. In an implementation, the user may select the alignment guide 263 using any known selection techniques (e.g., moving a cursor to the alignment guide 263, highlighting or clicking on the alignment guide 263, selecting the alignment guide 263 from a pull down menu of the camera 207 or the mobile device 106) and may use the adjustment button 280 to modify the alignment guide 263. In an implementation, the user 102 may select which alignment guide from a plurality of alignment guides is to be displayed on the field of view. The camera 207 or the mobile device may store a plurality of alignment guides, and the user 102 may use any known selection technique(s) to select an alignment guide that is be displayed on the field of view of the camera 207.

The adjustment button 280 may be provided as one or more physical buttons associated with the camera 207 or the mobile device 106 or may be provided as a selectable button, for example, on a touch screen associated with the camera 207 or the mobile device 106. In an implementation, the display for the image 260 may comprise a touch screen and the adjustment button 280 may be provided on the touch screen, e.g., overlaying some of the check image 247 and/or the background image 250.

In an implementation, instead of using the adjustment button 280, the user 102 may use a finger, a stylus, or any other input device to change the shape, aspect ratio, and/or the location of the alignment guide 263 in the field of view of the camera 207. Additionally or alternatively, the user 102 may perform cropping on the image 260 prior to the image being captured by the camera 207. Using any type of selection tool provided with the camera 207 or the mobile device 106, the user 102 may indicate the location of the edges 245 of the check image 247, for example. Such an indication may be used in the subsequent capture and/or processing of the image of the check 108.

Figure 5:
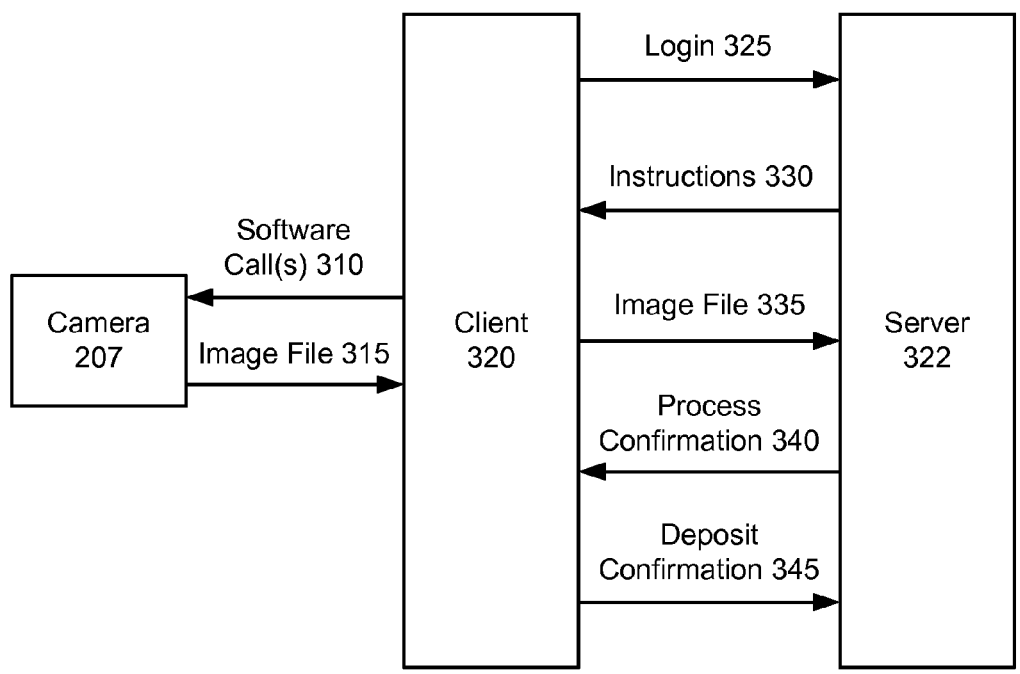
FIG. 5 shows a data flow diagram of a system for the deposit of a check, in accordance with an example embodiment.

FIG. 5 shows a data flow diagram of a system for the deposit of a check, in accordance with an example embodiment. In the data flow diagram of FIG. 5, a client 320 is one example of the mobile device 106 of the user 102 described with respect to the systems 100 and 200 of FIGS. 1 and 2, respectively. In an implementation, a server 322 may be a software component operable by the depository 204 of FIG. 2.

The client 320 may log in to a remote deposit system executed on the server 322. The login 325 may serve to authenticate the user 102 as an authorized consumer of the depository 204.

The server 322, in one example, may send instructions 330 to the client 320 that execute an application on the client 320. This may include instructions that cause a software object, which may have been previously downloaded and installed (e.g., pre-installed) on the client 320, to be executed on the client 320. The software object may generate and display an alignment guide, such as the alignment guide 235 or 263, in the field of view of a digital camera, such as the camera 207 associated with the mobile device 106.

In another example, the instructions 330 may include a wholly self-contained application that when delivered to the client 320 will execute and perform one or more operations described herein, such as those directed to generating and displaying an alignment guide in the field of view of the camera 207. In either example, the software object may be configured to make one or more software calls 310 to the camera 207. This may be through specific software instructions to the camera. In other words, the camera's functionality may not be abstracted through any software library. In such an example, software code may be written and delivered to every different camera-equipped mobile phone.

In an alternate example, the software object may operate through a software abstraction layer, such as an application programming interface (API). The software object developer may only insert code into the software object to call one or more APIs exposed by the software operating the mobile device. One example of such software is Windows Mobile by Microsoft Corporation. In the context of a Windows Mobile device, the Windows Mobile operating system (OS) has one or more APIs exposed to application developers that will translate instructions from applications into instructions operable by the camera 207 on the mobile device 106. A mobile operating system, also known as a mobile platform or a handheld operating system, is the operating system that controls a mobile device. Other mobiles OSs include Symbian OS, iPhone OS, Palm OS, BlackBerry OS, and Android.

The software object may cause the camera 207 to generate and display an alignment guide in the field of view and/or take a picture or capture one or more images of the check 108 being deposited. These images may be captured sequentially, e.g., pursuant to the user 102 flipping the check 108 over after an image of the front of the check 108 has been captured within the alignment guide. However, each side of the check 108 may be captured by the camera 207 using similar API calls. The images may be stored in an image file 315.

Once the images of one or both sides of the check 108 are captured within the alignment guide by the camera 207, the image file 315 may be operated on by the software object of the client 320. These operations may include any of the following: deskewing, dewarping, magnetic ink character recognition (MICR), cropping (either automatically, or having the user 102 manually identify the corners and/or edges of the check 108 for example), reducing the resolution of the image, number detection, character recognition, and the like.

With respect to number and character recognition, commercial check scanners have used characteristics of the MICR encoding to detect information about the check, such as the bank's routing number and the account number. However, the characteristics that these scanners have used are the magnetic characteristic of the ink itself and these scanners have used methods similar to those of magnetic audio tape readers. In an implementation, a software object of the client 320 may optically recognize the characters on the MICR line, as a consumer mobile device such as the mobile device 106 will lack the magnetic reading ability of a commercial check scanner.

The image may be also down converted into a grayscale or black and white image, such as either in Joint Photographic Experts Group (JPEG) compliant format or in tabbed image file format (TIFF) for example. In an alternate example, the image may be formatted as a Scalable Vector Graphics (SVG) image. One of the benefits of an SVG file is a large size advantage over JPEG. In the former example, the image at some point before entry into the clearing system may be converted to TIFF format. This may be performed at the mobile device 106, wherein the camera 207 captures the image in TIFF format. However, the camera 207 of the mobile device 106 may capture the image in JPEG format, which may then be converted into TIFF either at the mobile device 106 or at the server 322. In the latter example, this may use the transmission of the TIFF image across a communications network which may be more advantageous as TIFF images are typically smaller in file size for the same size of picture as a JPEG formatted image.

The software object on the client 320 may operate by performing one or more of the operations described herein and then transmitting an image file 335 (e.g., based on image file 315 that has been processed) to the server 322 after the user 102 confirms that they do wish to deposit the check 108. Alternately, the software object may capture the image of the check 108 and transmit that image to the server 322 that in turn may perform those operations, verifies that the image quality is within acceptable thresholds, and communicates that verification back to the client 320, which can then instruct the user 102 to take a picture of the other side of the check 108. In this example, the image transmitted to the server 322 may be in any format, such as JPEG or TIFF, insofar as the server software has the ability to convert that image into a Check 21 compliant format. Alternately, the bank may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37"). It is a binary interchange format.

The server 322 may confirm (e.g., using a process confirmation 340) with the user 102 the transmission, reception, and processing of each side of the check 108 separately, or may confirm both sides at the same time. On the server side, more operations may be performed, such as signature verification. Where to perform these operations may be determined by the processing power of the mobile device 106 itself, which is typically limited in computational power. However, the present discussion is not limited in any way by discussion of where certain operations are described as operating. The operations of detecting and verifying information may be performed by the client 320 before the information is transmitted along with the image in the image file 335 to the server 322. Alternately, the software object(s) operating on the mobile device 106 may perform no operation other then capturing images of the front and back of the check 108 within the alignment guide, receiving confirmation that the user 102 wishes to proceed, and transmitting those images to the server 322, wherein the server 322 performs those operations.

In an implementation, after the image file 335 has been received by the server 322, the server 322 may send a process confirmation 340 to the client 320. The process confirmation 340 may request instructions from the client 320 to continue proceeding with the deposit now that the server 322 has received the image file 335. In response, the client 320 may send a deposit confirmation 345 to the server 322, instructing the server 322 to process the deposit of the check based on the image file 335 that had been received by the server 322.

Figure 6:
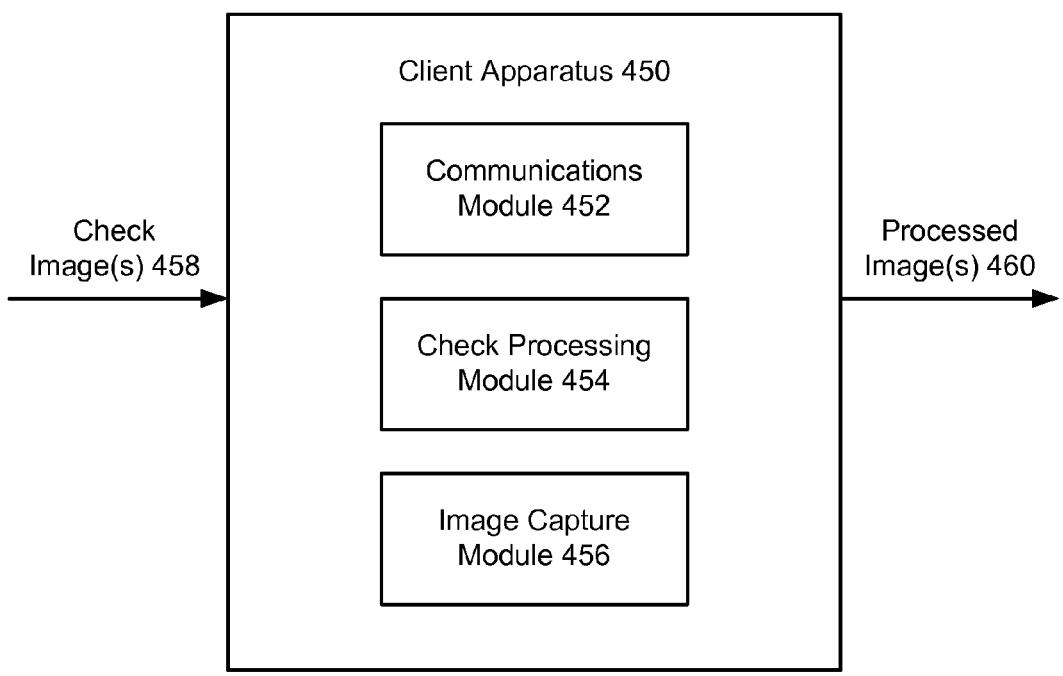
FIG. 6 shows a block diagram of a client apparatus for the deposit of a check, in accordance with an example embodiment.

FIG. 6 shows a block diagram of a client apparatus 450 for the deposit of a check, in accordance with an example embodiment. The client apparatus 450 may include one or more software objects operating on a mobile device 106, such as described above. The client apparatus 450 may include a communications module 452, a check processing module 454, and an image capture module 456. The client apparatus 450 may receive, in one example, one or more check images 458 captured within an alignment guide as an input and output one or more processed images 460.

In an implementation, the check images 458 may be received following a software call from the check processing module 454 to the image capture module 456. In such an implementation, the image capture module 456 may include the camera 207 contained within the mobile device 106. Alternately, the camera 207 may be detachably coupled to the mobile device 106 such as through a secure digital (SD) slot or over any suitable communications bus, such as USB (universal serial bus).

Figure 7:
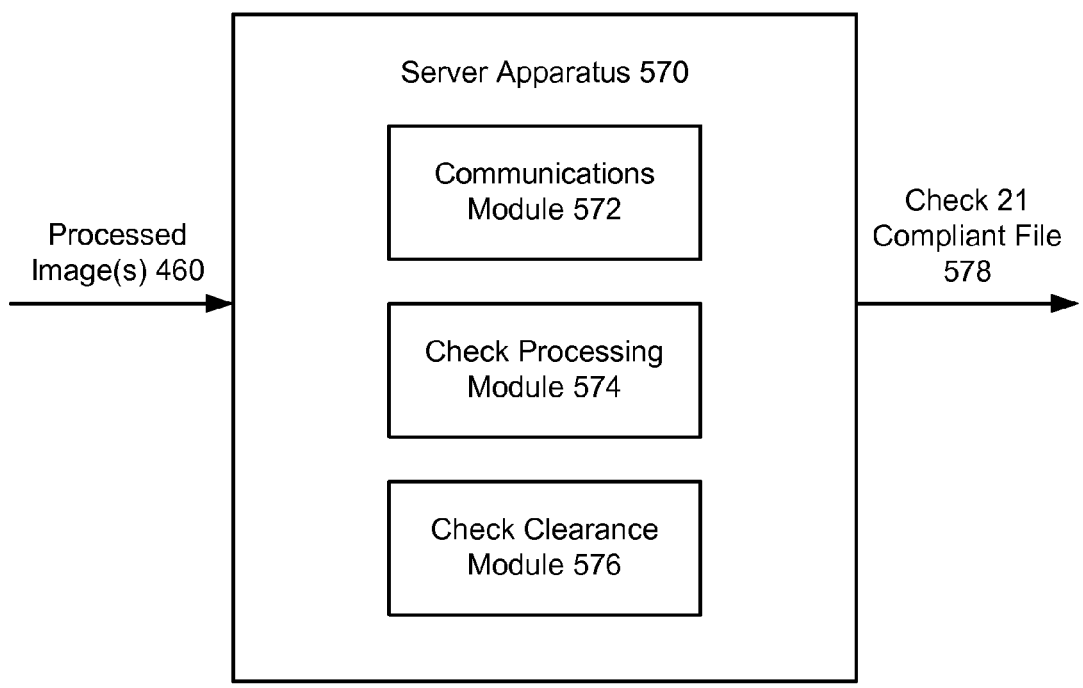
FIG. 7 shows a block diagram of a server apparatus for the deposit of a check, in accordance with an example embodiment.

In an implementation, the image capture module 456 may retrieve previously captured and stored image files (e.g., in local, remote, or removable storage associated with the client apparatus 450) and send the image files to a financial institution (e.g., financial institution 130, the server 322, the server apparatus 570 of FIG. 7, etc.) for processing.

In an implementation, the client apparatus 450 may comprise a browser such as a web browser, for accessing a website on the Internet or other network associated with a financial institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. While the bandwidth available to the mobile device 106 may be an implementation concern such discussion is outside the scope of the present discussion and any suitable wireless communications network is considered to be within the scope of the present discussion. With respect to the present discussion, the communications module 452 may receive one or more processed check images 460 from the check processing module 454 and may transmit them over the suitable communications network to the depository 204, as described herein.

The check processing module 454 may be configured, in one example, to cause the image capture module 456 to capture a digital image of at least one side of a check within an alignment guide provided in a field of view of the camera 207. The alignment guide is intended to ensure that the image of the check is suitable for one or more processing tasks. For instance, if the check is rotated 45 degrees clockwise when captured, the check processing module 454 or a software object operated on the server 322 described above may be unable to optically detect information on the check.

The check processing module 454 may then perform one or more cleaning operations on the image of the check. For example, the check processing module 454 may deskew the image. Another aspect of an image that may be cleaned is a warping of the image. Warping, as used herein, is meant to denote that the check is tilted forward or back with respect to a plane that is perpendicular to a line drawn from the camera lens to the center of the check. Warping, or tilting, of the image may also lead to incorrect optical detection of the check. In an implementation, the check processing module 454 may dewarp the check image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image.

Alternatively, the check processing module 454 may send instructions to the image capture module 456 to cause the image capture module 456 to capture an image of the check at a suitable resolution within an alignment guide. The check processing module 454 may additionally perform any of the following operations, in further examples: convert from JPEG to TIFF, detect check information, perform signature detection on the image of the check, and the like. The check processing module 454 may, alternatively, send the captured check image to the server described herein for such processing, and receive confirmation that the operations were completed before further operations can proceed.

One of the issues with check processing is to detect the presence of a check against whatever background is present. While a user may be instructed to place the check on a dark or black background, such instructions may not provide a positive user experience. Alternatively or additionally, edge detection may be used to detect the check. Edge detection techniques are well known and any suitable method may be used herein. Alternative or additional methodology for check detection may use tile-cropping to detect and process the check.

The size of the file sent between the mobile device and the server may be small. This runs counter with respect to automatic check detection against a background. If captured in color, the contrast between check and background becomes easier. However, the processed image sent over the communications network may need to be smaller, and if the detection operation is performed by the server, it may be advantageous to convert the captured image to grayscale, or even black and white, before transmission to the server. Grayscale images are compliant with the Check 21 Act.

While "flat" is a fairly well known term to users, each user's appreciation of flat with respect to the camera lens of the camera 207 associated with the mobile device 106 may result in a problem with needing to align the check image programmatically or risk rejecting a large number of check images. As the image captured is a set of pixels, a tilted image will result in a jagged polygon rather than a perfect rectangle. Using convex hull algorithms, the check processing modules may create a smooth polygon around the boundary and remove the concavity of the check image. Alternatively, a rotating calipers algorithm may be used to determine the tightest fitting rectangle around the check boundary, which can then be used to determine the angle of it, with that angle being used to align the check properly.

The operator of the camera 207 may introduce distortions in the image due to a perspective problem, specifically an angling of the camera vertically over the check, and the top of the check is smaller than the bottom, or the reverse. A warping transformation algorithm (e.g., which may be exposed as a software call within Java advanced imaging) may be used to remove this distortion.

If user involvement is tolerated, the user may be queried to supply or identify three of the four corners of the check. In such an operation, the fourth corner may be derived, showing the perimeter of the check. This may allow a software object described herein to use less computational resources in processing the image of the check.

FIG. 7 shows a block diagram of a server apparatus 570 for the deposit of a check, in accordance with an example embodiment. Aspects of an example server apparatus are described with respect to FIG. 10. The server apparatus 570 may include one or more software objects operating on a server operated by the depository 204 described above with respect to FIG. 2. The server apparatus 570 may include a communications module 572, a check processing module 574, and a check clearance module 576. The server apparatus 570 may receive one or more processed images 460 from a mobile device 106 or a client apparatus 450 as an input and may output a file such as a Check 21 compliant file 578. The Check 21 compliant file 578 may be a file or entry in a record set that is compliant with the clearinghouse rules set forth in the Check 21 Act and may include outputting an X9.37 file, in one example.

The communications module 572 may be configured to receive a wireless communication from the mobile device 106 over any suitable communications network, such as those described above. The communications module 572 may additionally receive a communication over a different communications network than the mobile device 106 communicated on, such as receiving the communication over a TCP/IP (Transmission Control Protocol/Internet Protocol) connection from the user's communication provider.

The check processing module 574 may be configured, in one example, to perform one or more check processing operations on the processed image(s) 460 that are received. In an implementation, these operations may include any of the operations described herein with respect to the check processing module 454 of FIG. 6. The operation of signature verification may be performed by the check processing module 574 of the server apparatus 570 as the server apparatus 570 may interface with other systems of the depository 204 that may maintain previously verified signature samples of the user 102. Performing signature verification at the client apparatus 450 may be computationally unfeasible; additionally, there may be a security risk if the signature sample is stored on the user's own device.

A cropped grayscale image may be sent to the server apparatus 570. The server apparatus 570 may perform further processing to remove distortion such as warping. The server apparatus 570 may extract information via a TIFF conversion and determine the DPI and re-scale to the proper DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file may be delivered to the check clearinghouse and funds may be received by the depository 204. The availability of the funds to the user 102 may be delayed by this operation such that the user 102 only has access to those funds when the depository 204 receives confirmation that the check has cleared.

Figure 8:
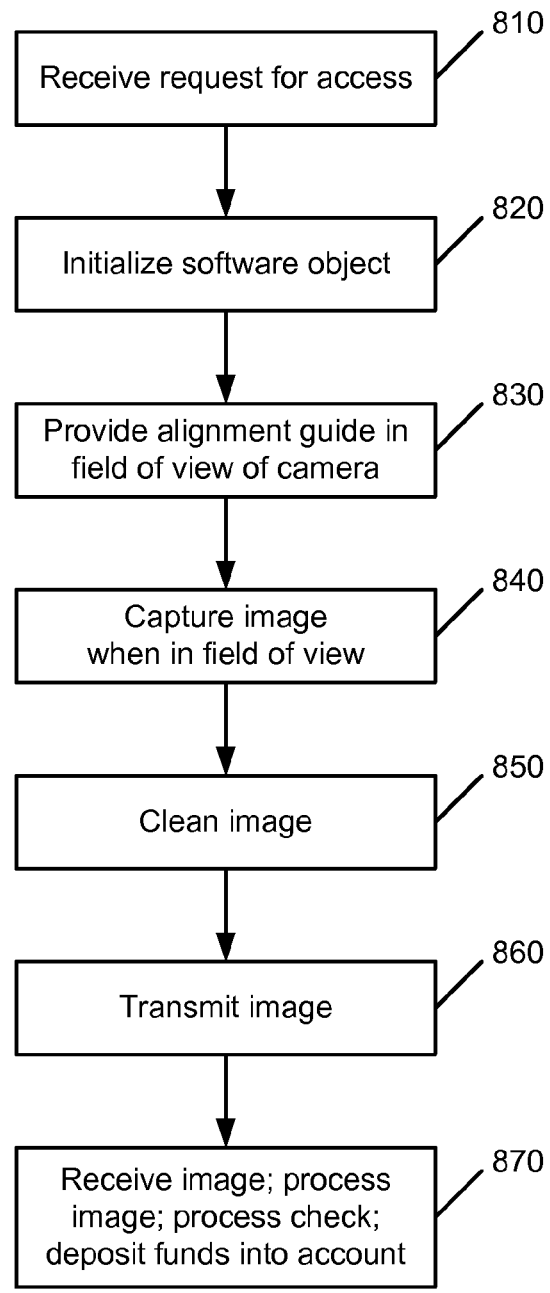
FIG. 8 is an operational flow of an implementation of a method that may be used for deposit of a check using alignment of the check.

FIG. 8 is an operational flow of an implementation of a method 800 that may be used for deposit of a check using alignment of the check. At 810, a request for access may be received from a user (e.g., the user 102). The user may request access to a deposit system operated by a depository (e.g., the depository 204) by way of a mobile device (e.g., the mobile device 106) such as, such a cellular phone, a PDA, a handheld computing device, etc. operated by the user. The access may be through some sort of user login, in some examples. The deposit system may be configured to receive a deposit of a negotiable instrument, such as a check, money order, cashier's check, etc. from the user and clear the negotiable instrument in a suitable clearinghouse system.

At 820, the system may initialize a software object on the mobile device. This may include sending instructions to the mobile device intended to execute a previously installed (i.e., pre-installed) software object. Alternatively, the system may send a software object to the mobile device that may execute the software object, carry out operations described herein by use of the software object, and terminate the software object. In an implementation, the system may instruct a camera associated with the mobile device to capture an image of the negotiable instrument. The system may also instruct the camera or the mobile device to generate and display an alignment guide in the field of view of the camera.

At 830, an alignment guide, such as the alignment guide 235 or 263, may be provided in the field of view of the camera. The alignment guide may be generated and displayed pursuant to instructions received at the camera or mobile device from the deposit system operated by a depository, the server 322, or the server apparatus 570, for example.

At 840, an image of the check may be captured when the check is displayed within the alignment guide in the field of view. This may be accomplished through the software object accessing a camera associated with the mobile device (e.g., either comprised within the mobile device or separate from the mobile device). This may be done through an API exposed by the OS of the mobile device, or may be through software code customized for a specific phone and specific camera. With respect to the former, a developer of the software object may write code to the camera API(s), which may be specific to the OS and without regard to the camera on the device. In an implementation, the user may be directed to scale or move the captured image to ensure it is properly framed within the alignment guide.

At 850, the image may be cleaned. Cleaning may include converting the image from JPEG format to TIFF format. Other cleaning operations are described herein. Cleaning operations may also be augmented by detecting operations. The operations at 850 may be carried out on the mobile device, in an implementation, though may include sending the image to the server apparatus, which may perform one or more cleaning operations and when complete may send a notification back to the mobile device of the completion. In either instance, the image may be deskewed, dewarped, and cropped for example, at 850. Additionally, detection operations may be performed, e.g. after the cleaning operations are performed. The detection operations may include any of the following, for example: optically read the MICR line, courtesy amount recognition (CAR), legal amount recognition (LAR), signature block, and payee. As discussed above, the detecting operations may be performed by the client, the server, or some combination thereof.

In an implementation, an application on the mobile device may crop the image around where the alignment guide was during the image capture. Edge detection may be performed on the cropped image. In an implementation, the user may manually perform cropping on the image after the application crops the image around the alignment guide's position.

At 860, the cleaned image may be transmitted to the depository. This may include transmitting the cleaned image alone to the depository, but may also include transmitting the detected information on the check to the depository. In an implementation, coordinate data of the alignment guide may be provided to the depository. Such coordinate data may correspond to the coordinates of the alignment guide in the field of view of the camera or in the image generated by the camera. Alternatively or additionally, the user can identify on the display of the captured image where each of the corners of the check is and the coordinate data (e.g., pertaining to the identified corners) and/or corner identification information may be provided to the depository along with the image of the check. The depository may use the coordinate data and/or corner identification information during subsequent processing such as cropping, edge detection, etc.

At 870, the depository may receive the cleaned image of the check (along with financial information pertaining to the account for depositing funds, for example) and may process the image. Processing of the digital image file may include retrieving financial information regarding the check. The financial information may comprise the MICR number, the routing number, an amount, etc. Any known image processing technology may be used, such as edge detection, filtering to remove imagery except the check image or check data in the received digital image file, image sharpening, and technologies to distinguish between the front and the back sides of the check. The depository may identify and/or remove at least a portion of data that is extraneous to the check, such as background data.

After retrieving the financial information from the check in an electronic data representation form, the depository may determine whether the financial information such as the amount payable to the user, the account associated with the user to deposit funds, an account associated with a payor to debit funds, and an institution associated with the payor, etc., may be valid. For example, the depository may include electronic devices such as computers, servers, databases, or the like that may be in communication with each other. The electronic devices may receive an electronic data representation and may perform an analysis on the quality of the data representation, the readability of the data representation, or the like. For example, the electronic devices may determine whether the account number, amount payable, or the like may be readable such that they may be parsed and processed by the depository to credit an account associated with the user.

If the financial information is determined to be valid, the electronic data representation may be processed by the depository, thereby depositing the money in the user's account. If the financial information is determined to be invalid, then the user may be advised. For example, the depository may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the deposit again (e.g., make another image of the check within the alignment guide and send it to the depository) or whether the user would like assistance from a representative, for example. The user may indicate how they would like to proceed.

If the user would like assistance, the financial information may be transferred to a representative for further review. The representative may review the financial information associated with the electronic data representation to determine whether to allow the electronic data representation to be processed by the depository. If so, the electronic data representation of the financial information may be processed by the depository, thereby depositing the check in the user's account. The depository may send a notice to the user via email, facsimile, instant message, or mail, for example, that the check has been deposited into the selected account.

Figure 9:
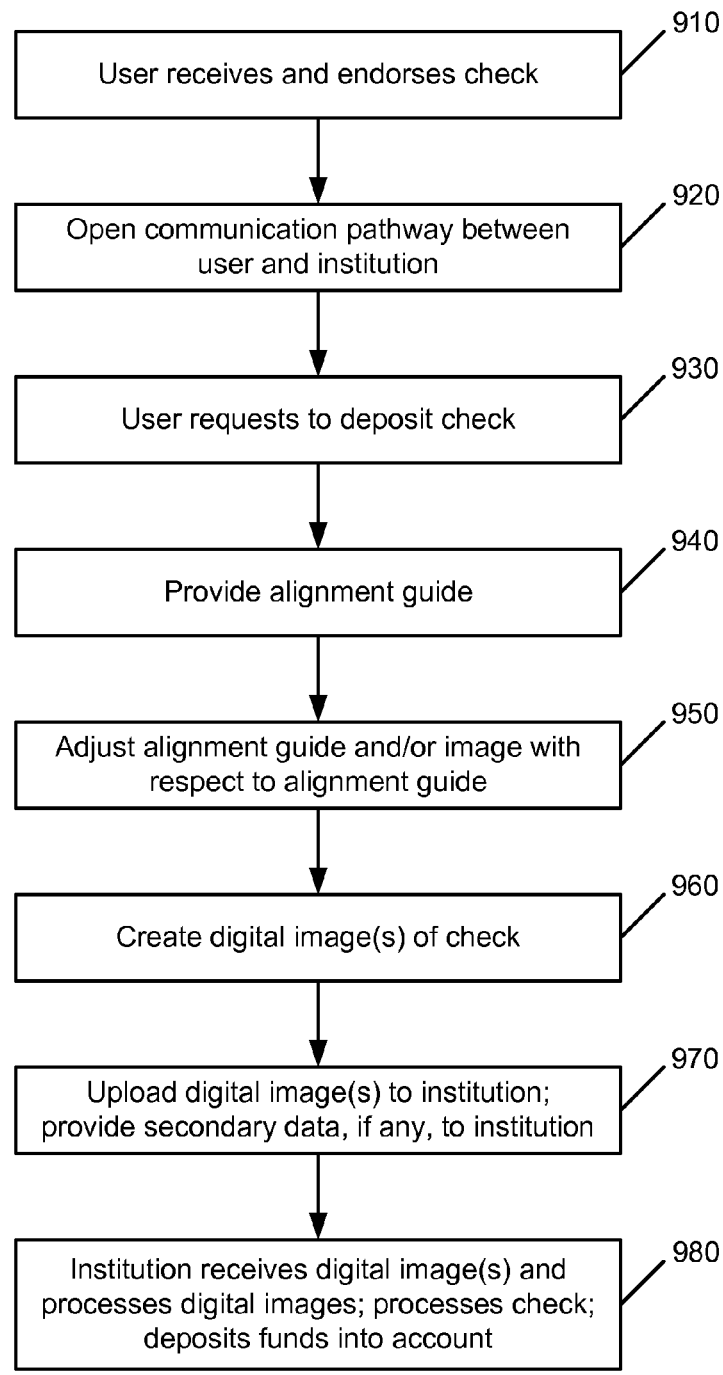
FIG. 9 is an operational flow of another implementation of a method that may be used for deposit of a check using alignment of the check.

FIG. 9 is an operational flow of another implementation of a method 900 that may be used for deposit of a check using alignment of the check. A user (e.g., the user 102) may receive and endorse a check (e.g., the check 108) at 910 and open a communication pathway with an institution (e.g., the financial institution 130), at 920. In an implementation, the user may open a communication pathway with the institution by logging into a website of the institution, for example. There may be several ways in which a communication pathway may be established, including, but not limited to, an Internet connection via a website of the institution. The user may access the website and log into the website using credentials, such as, but not limited to, a username and a password.

At 930, the user may send a request to deposit the check and may select an account in which to deposit the check. In an implementation, the user may select a "deposit check" option provided on the website, and may enter details such as check amount, date, the account the check funds should be deposited in, comments, etc.

At 940, an alignment guide may be provided in the field of view of the camera that is used to create a digital image of the check. The alignment guide, such as the alignment guide 263, may be adjustable, e.g., using an adjustment button, such as the adjustment button 280, or other selection and adjustment techniques.

The user may position the camera and the check such that the check is in the field of view of the camera, and at 950, may manually adjust the alignment guide and/or the check so that the alignment guide is adjusted with respect to the image of the check that is displayed in the field of view. Alternatively, the camera, the mobile device, or the institution may adjust the alignment guide without user intervention so that the image of the check that is displayed in the field of view is positioned within the alignment guide. In an implementation, the camera, the mobile device, or the institution may provide feedback to the user regarding the alignment guide and the positioning of the check with respect to the alignment guide.

At 960, when the image of the check is within the alignment guide, a digital image of the check may be created using the camera. In an implementation, the user may instruct the camera (e.g., by pressing a button on the camera or the mobile device) to create the digital image. In another implementation, the camera may automatically create the digital image as soon as the image of the check is within the alignment guide. In this manner, the user may point the camera at the check such that the image of the check appears in the field of view, and after the alignment guide has been adjusted (either by the user or automatically by the camera, the mobile device, or the financial institution via a communications network) and/or the check has been repositioned within the alignment guide by the user, a digital image of the check may be created without further user intervention. Depending on the implementation, one or more digital images of the check (e.g., corresponding to the front and back of the check) may be created using such techniques.

At 970, the digital image(s) may be uploaded to the institution using any known image upload process. In an implementation, the upload may be augmented by secondary data which may be information relating to the deposit of the check, such as an account number and a deposit amount, for example. At 980, when the institution has received the digital images (e.g., of the front and back sides of the check), the institution may process the digital images to obtain an image of the check and to deposit the funds of the check in the user's account, as described herein.

It is contemplated that processing such as grayscale conversion, image cropping, image compression, dewarping, edge and/or corner detection, etc. may be implemented in the method 900. Such operations may be performed on one or more digital images created by the camera and may be performed on the image(s) by the mobile device and/or by the institution, as described further above.

Although the examples described herein may refer to uploading of images of checks to an institution, it is contemplated that any negotiable instrument or image (e.g., vehicle accident pictures provided to an insurance company) may be processed and/or transmitted using the techniques described herein. Additionally, one or more of the techniques described herein may be performed by the institution instead of the mobile device of the user.

Figure 10:
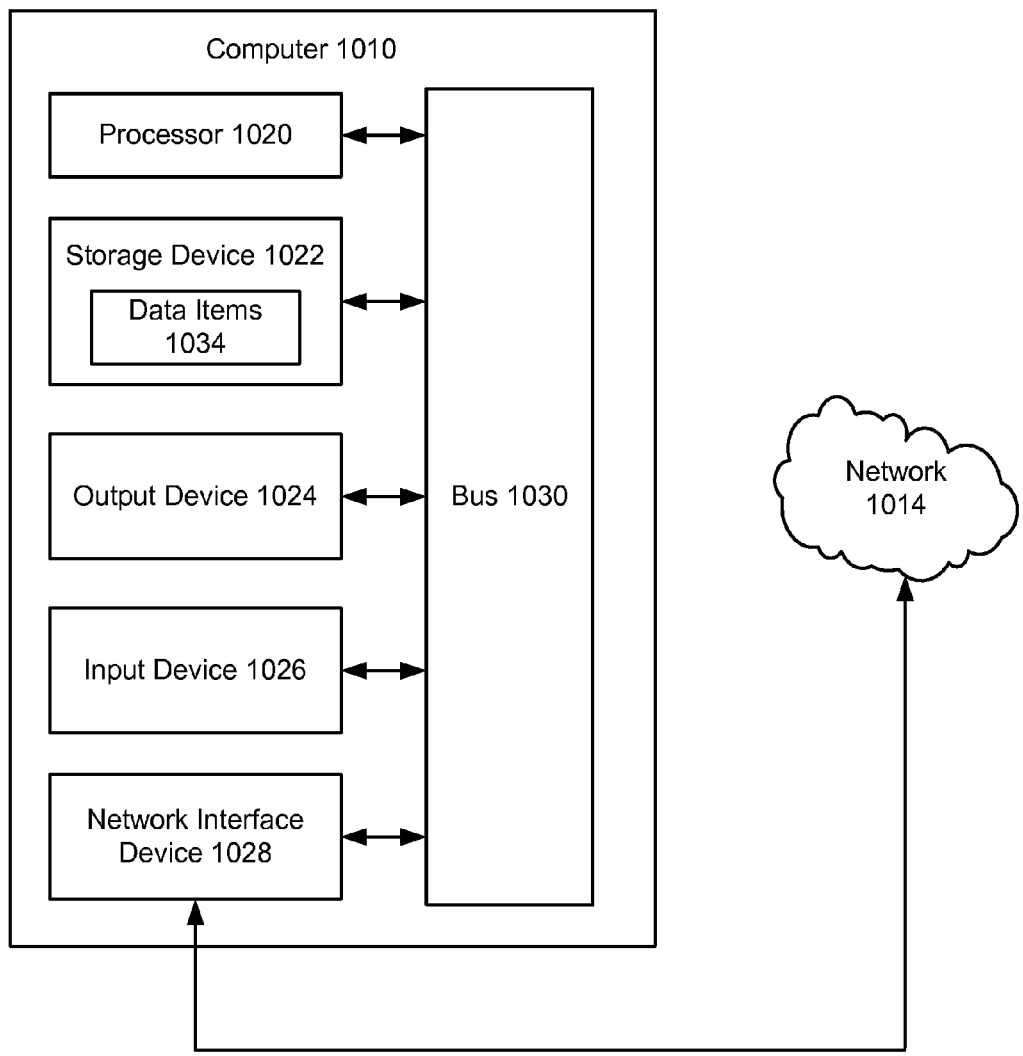
FIG. 10 is a block diagram of an example computing environment in which example embodiments and aspects may be implemented.

FIG. 10 is a block diagram of an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, a system 1000 includes a computer 1010 connected to a network 1014. The computer 1010 includes a processor 1020, a storage device 1022, an output device 1024, an input device 1026, and a network interface device 1028, all connected via a bus 1030. The processor 1020 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1020 executes instructions and includes that portion of the computer 1010 that controls the operation of the entire computer. Although not depicted in FIG. 10, the processor 1020 typically includes a control unit that organizes data and program storage in memory and transfers data and other information between the various parts of the computer 1010. The processor 1020 receives input data from the input device 1026 and the network 1014 reads and stores code and data in the storage device 1022 and presents data to the output device 1024.

Although the computer 1010 is shown to contain only a single processor 1020 and a single bus 1030, the disclosed embodiment applies equally to computers that may have multiple processors and to computers that may have multiple busses with some or all performing different functions in different ways.

The storage device 1022 represents one or more mechanisms for storing data. For example, the storage device 1022 may include read-only memory (ROM), RAM, magnetic disk storage media, optical storage media, flash memory devices, and/or other machine-readable media. In other embodiments, any appropriate type of storage device may be used. Although only one storage device 1022 is shown, multiple storage devices and multiple types of storage devices may be present. Further, although the computer 1010 is drawn to contain the storage device 1022, it may be distributed across other computers, for example on a server.

The storage device 1022 includes a controller (not shown in FIG. 10) and data items 1034. The controller includes instructions capable of being executed on the processor 1020 to carry out the functions as previously described herein with reference to FIGS. 1-9. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 1022 may also contain additional software and data (not shown), which is not necessary to understand the invention. Although the controller and the data items 1034 are shown to be within the storage device 1022 in the computer 1010, some or all of them may be distributed across other systems, for example on a server and accessed via the network 1014.

The output device 1024 is that part of the computer 1010 that displays output to the user. The output device 1024 may be a liquid crystal display (LCD) well-known in the art of computer hardware. In other embodiments, the output device 1024 may be replaced with a gas or plasma-based flat-panel display or a traditional cathode-ray tube (CRT) display. In still other embodiments, any appropriate display device may be used. Although only one output device 1024 is shown, in other embodiments any number of output devices of different types, or of the same type, may be present. In an embodiment, the output device 1024 displays a user interface.

The input device 1026 may be a keyboard, mouse or other pointing device, trackball, touchpad, touch screen, keypad, microphone, voice recognition device, or any other appropriate mechanism for the user to input data to the computer 1010 and manipulate the user interface previously discussed. Although only one input device 1026 is shown, in another embodiment any number and type of input devices may be present.

The network interface device 1028 provides connectivity from the computer 1010 to the network 1014 through any suitable communications protocol. The network interface device 1028 sends and receives data items from the network 1014.

The bus 1030 may represent one or more busses, e.g., USB, PCI, ISA (Industry Standard Architecture), X-Bus, EISA (Extended Industry Standard Architecture), or any other appropriate bus and/or bridge (also called a bus controller).

The computer 1010 may be implemented using any suitable hardware and/or software, such as a personal computer or other electronic computing device. Portable computers, laptop or notebook computers, PDAs, pocket computers, appliances, telephones, and mainframe computers are examples of other possible configurations of the computer 1010. For example, other peripheral devices such as audio adapters or chip programming devices, such as EPROM (Erasable Programmable Read-Only Memory) programming devices may be used in addition to, or in place of, the hardware already depicted.

The network 1014 may be any suitable network and may support any appropriate protocol suitable for communication to the computer 1010. In an embodiment, the network 1014 may support wireless communications. In another embodiment, the network 1014 may support hard-wired communications, such as a telephone line or cable. In another embodiment, the network 1014 may support the Ethernet IEEE (Institute of Electrical and Electronics Engineers) 802.3x specification. In another embodiment, the network 1014 may be the Internet and may support IP (Internet Protocol). In another embodiment, the network 1014 may be a LAN or a WAN. In another embodiment, the network 1014 may be a hotspot service provider network. In another embodiment, the network 1014 may be an intranet. In another embodiment, the network 1014 may be a GPRS (General Packet Radio Service) network. In another embodiment, the network 1014 may be any appropriate cellular data network or cell-based radio network technology. In another embodiment, the network 1014 may be an IEEE 802.11 wireless network. In still another embodiment, the network 1014 may be any suitable network or combination of networks. Although one network 1014 is shown, in other embodiments any number of networks (of the same or different types) may be present.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for depositing a check, comprising:
a mobile device having a camera, a display and a processor, wherein the processor is configured to:
project an alignment guide in the display of the mobile device, the display of the mobile device displaying a field of view of the camera;
monitor an image of the check that is within the field of view;
determine whether the image of the check aligns with the alignment guide;
automatically capture the image of the check when the image of the check is determined to align with the alignment guide; and
transmit the captured image of the check from the camera to a depository via a communication pathway between the mobile device and the depository.

2. The system of claim 1, wherein the processor is further configured to
obtain financial information pertaining to the check from the captured image of the check.

3. The system of claim 1, wherein the processor is further configured to receive instructions inputted to the mobile device for adjusting the alignment guide, and adjust the alignment guide according to the received instructions.

4. The system of claim 1, wherein the processor is further configured to crop the image of the check around the alignment guide prior to transmitting the image to the depository.

5. The system of claim 1, wherein the processor is further configured to provide corner identification information pertaining to the image of the check, and control the mobile device to transmit the corner identification information to the depository.

6. The system of claim 1, wherein the alignment guide is comprised of a three sided opened box.

7. The system of claim 1, wherein the processor is configured to determine the image of the check aligns with the alignment guide when at least one edge of the image of the check aligns with at least one line portion of the alignment guide.

8. The system of claim 1, wherein the processor is configured to determine the image of the check aligns with the alignment guide when at least a first edge and second edge of the image of the check aligns parallel, respectively, to a first line portion and a second line portion of the alignment guide.

9. The system of claim 1, wherein the processor is configured to determine the image of the check aligns with the alignment guide when at least a first edge, second edge and a third edge of the image of the check aligns parallel, respectively, to a first line portion, second line portion and a third line portion of the alignment guide.

10. A non-transitory computer-readable medium comprising instructions for depositing a check, said instructions being executed by a processor of a mobile device to:
project an alignment guide in a display of the mobile device, the display of the mobile device displaying a field of view of a camera of the mobile device;
monitor an image of the check that is within the field of view of the camera;
determine whether the image of the check aligns with the alignment guide;
automatically capture the image of the check when the image of the check is determined to align with the alignment guide; and
transmit the image of the check from the mobile device to a deposit system.

11. The non-transitory computer-readable medium of claim 10, wherein the instructions are further executed by the processor to clean the image of the check prior to transmitting the image to the deposit system.

12. The non-transitory computer-readable medium of claim 11, wherein cleaning the image comprises at least cropping the image of the check around the alignment guide and performing edge detection on the image of the check.

13. The non-transitory computer-readable medium of claim 10, wherein the instructions are further executed by the processor to adjust the alignment guide according to received inputs corresponding to an adjustment button of the camera.

14. The non-transitory computer-readable medium of claim 10, wherein the instructions are further executed by the processor to adjust the alignment guide so that the image of the check is displayed within the alignment guide.

15. The non-transitory computer-readable medium of claim 10, wherein the instructions are further executed by the processor to determine the image of the check aligns with the alignment guide when at least one edge of the image of the check aligns with at least one line portion of the alignment guide.

16. The non-transitory computer-readable medium of claim 10, wherein the instructions are further executed by the processor to determine the image of the check aligns with the alignment guide when at least a first edge, second edge and a third edge of the image of the check aligns parallel, respectively, to a first line portion, second line portion and a third line portion of the alignment guide.

17. The non-transitory computer-readable medium of claim 10, wherein the instructions are further executed by the processor to determine the image of the check aligns with the alignment guide when at least a first edge and second edge of the image of the check aligns parallel, respectively, to a first line portion and a second line portion of the alignment guide.

18. The non-transitory computer-readable medium of claim 10, wherein the alignment guide is comprised of a three sided opened box.

19. A non-transitory computer-readable medium comprising computer-readable instructions for depositing a check, said computer-readable instructions being executed by a processor to:
receive at a server a request for access to a deposit system from a mobile device;
receive at the server an image of the check from the mobile device, wherein at least an edge of the image of the check has been aligned with an alignment guide;
clean the image of the check at a check processing module of the server using information corresponding to the alignment guide; and
deposit funds of the check into an account associated with the deposit system using the cleaned image of the check.

20. The non-transitory computer-readable medium of claim 19, wherein the computer-readable instructions are further executed by the processor to clean the image of the check at the check processing module by using corner identification information pertaining to corners of the check in the image of the check, wherein the corner identification information is received from the mobile device.

21. The non-transitory computer-readable medium of claim 19, wherein the computer-readable instructions are further executed by the processor to send a self-contained software object to the mobile device that when executed on the mobile device causes the mobile device to automatically capture the image of the check when the image of the check aligns with the alignment guide.

22. The non-transitory computer-readable medium of claim 19, wherein the computer-readable instructions are further executed by the processor to send instructions to the mobile device that when executed on the mobile device causes the mobile device to initialize a pre-installed software object on the mobile device directed to providing the alignment guide in a display of the mobile device, wherein the display is configured to display a field of view of a camera of the mobile device and the camera is configured to automatically capture the image of the check when the image of the check aligns with the alignment guide.

23. The non-transitory computer-readable medium of claim 19, wherein the computer-readable instructions are further executed by the processor to clean the image of the check by cropping the image of the check around the alignment guide.

* * * * *